United States Patent
Kim (10) Patent No.: US 9,539,902 B2
(45) Date of Patent: Jan. 10, 2017

(54) SYSTEM FOR SYNCHRONIZATION OF APPLICATIONS BETWEEN VEHICLE HEAD UNIT AND COMPANION DEVICE

(71) Applicant: Toyota Motor Engineering & Manufacturing North America, Inc., Erlanger, KY (US)

(72) Inventor: Sinae Kim, Novi, MI (US)

(73) Assignee: Toyota Motor Engineering & Manufacturing North America, Inc., Erlanger (KY)

( * ) Notice: Subject to any disclaimer, the term of this patent is extended or adjusted under 35 U.S.C. 154(b) by 20 days.

(21) Appl. No.: 14/548,613

(22) Filed: Nov. 20, 2014

(65) Prior Publication Data
US 2016/0144714 A1    May 26, 2016

(51) Int. Cl.
| | | |
|---|---|---|
| G06F 7/00 | (2006.01) | |
| B60K 35/00 | (2006.01) | |
| B60H 1/00 | (2006.01) | |
| H04M 1/60 | (2006.01) | |
| H04M 1/725 | (2006.01) | |

(52) U.S. Cl.
CPC ........... *B60K 35/00* (2013.01); *B60H 1/00642* (2013.01); *H04M 1/7253* (2013.01); *B60K 2350/1068* (2013.01); *H04M 1/6091* (2013.01); *H04M 1/72522* (2013.01)

(58) Field of Classification Search
CPC .................... B60W 50/08; B60K 35/00; B60K 2350/1068; B60H 1/00; B60H 1/00642; G06F 3/0481; G06F 3/04817
USPC ....................... 701/36; 455/556.1, 557, 569.2
See application file for complete search history.

(56) References Cited

U.S. PATENT DOCUMENTS

| | | | |
|---|---|---|---|
| 8,615,273 B2 | 12/2013 | Bauer et al. | |
| 2012/0183221 A1* | 7/2012 | Alasry | G10L 15/06 382/181 |
| 2013/0238165 A1 | 9/2013 | Garrett et al. | |
| 2014/0179274 A1 | 6/2014 | O'Meara et al. | |
| 2015/0073651 A1* | 3/2015 | Nagara | B60W 50/08 701/36 |
| 2015/0266378 A1* | 9/2015 | Hwang | B60K 35/00 701/2 |

* cited by examiner

*Primary Examiner* — Thomas G Black
*Assistant Examiner* — Luke Huynh
(74) *Attorney, Agent, or Firm* — Christopher G. Darrow; Darrow Mustafa PC (57) ABSTRACT

Disclosed here is a system for a vehicle including a personal electronic device in communication with a vehicle head unit, the personal electronic device synchronized with the vehicle head unit for controlling which application icons appear on the vehicle head unit. Also disclosed is a computer storage media having embodied thereon computer-useable instructions that, when executed, perform a method, the method includes synchronizing the display of a plurality of applications that each operate a respective vehicle system between a vehicle head unit and a personal electronic device.

18 Claims, 9 Drawing Sheets

SYSTEM FOR SYNCHRONIZATION OF APPLICATIONS BETWEEN VEHICLE HEAD UNIT AND COMPANION DEVICE

BACKGROUND

The present disclosure relates to a vehicle and, more particularly, to a head unit synchronization system therefor.

Vehicles often include various systems such as infotainment and navigation systems. These systems are generally provided with a display around which mechanical control elements are arranged to provide a user interface mounted in a dashboard of a vehicle cabin for driver and front passenger access. Alternatively, the display combines at least some of the control elements into a touch panel display.

Conventionally, a vehicle head unit is an interface located in the vehicle dash board to provide user control of vehicle systems. For example, the user may be able to select application icons that appear on the head unit display.

In some cases, the vehicle head unit is configurable by a user to access the vehicle systems in a desired manner. Typically, such configuration is performed on the head unit or via a personal computer for transfer to the vehicle via removable media. Although effective, the configuration is relatively static based on an original setup profile due at least in part to the limited space on the head unit display which provides access to, but a relatively minimal number of application icons.

SUMMARY

The system and method described herein includes a personal electronic device in communication with a vehicle head unit of a vehicle such that application icons on the vehicle head unit and the personal electronic device are synchronized. The synchronization permits the vehicle head unit to be specifically configured to each user in response to the personal electronic device of that user.

A system for a vehicle, according to one disclosed non-limiting embodiment, includes a personal electronic device in communication with a vehicle head unit, the personal electronic device synchronized with the vehicle head unit to control which application icons are available on the head unit and the personal electronic device.

In another implementation, a computer storage media is disclosed herein having embodied thereon computer-useable instructions that, when executed, perform a method, the method according to one disclosed non-limiting embodiment includes synchronizing a multiple of applications that operate a respective vehicle system between a vehicle head unit and a personal electronic device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Disclosed herein are a system and a method of synchronizing a plurality of applications, each operating a respective vehicle system, between a vehicle head unit and a personal electronic device. The personal electronic device can be utilized to install or remove particular application icons that represent particular applications on the vehicle head unit. The personal electronic device can also be utilized to arrange the layout of the particular application icons that represent particular applications on the vehicle head unit.

Figure 1:
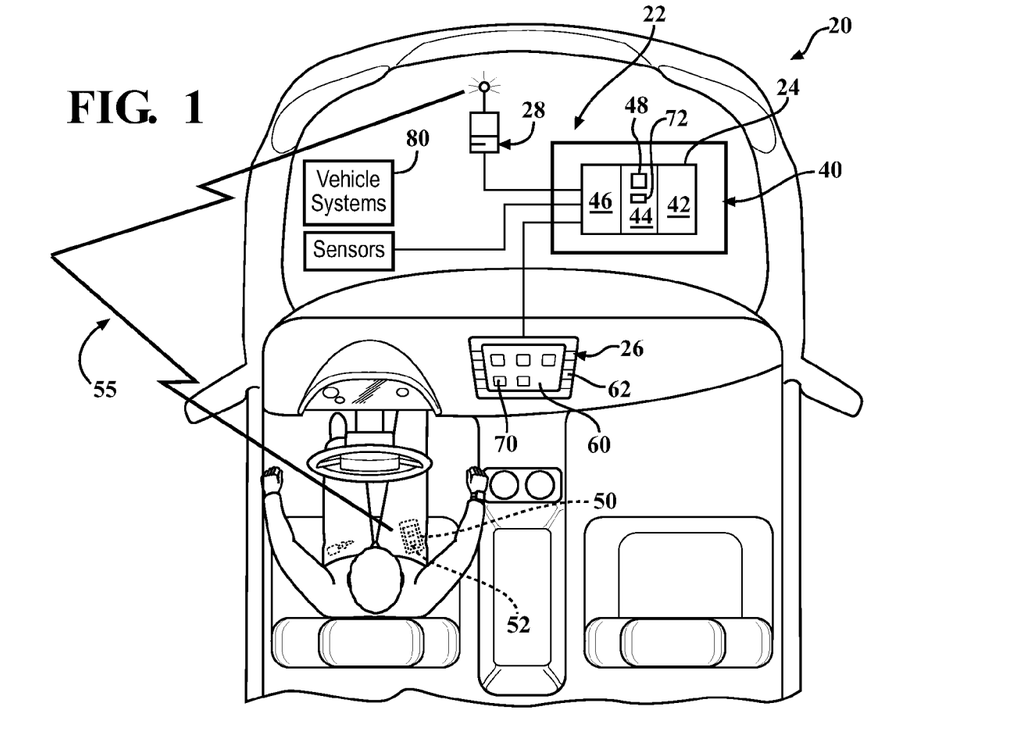
FIG. 1 is a schematic view of an example vehicle system.

FIG. 1 schematically illustrates a vehicle 20 with a vehicle head unit 22. As will be further described, the vehicle head unit 22 is operable to display content that can include personalized information, entertainment content such as videos, games, maps, navigation, vehicle diagnostics, calendar information, weather information, vehicle climate controls, vehicle entertainment controls, email, internet browsing, or any other interactive applications associated with a user.

The vehicle head unit 22 can include a control system 24, an interactive display system 26, and a communication system 28. It should be appreciated that, although particular systems are separately defined, each or any of the systems may be otherwise combined or separated via hardware and/or software.

The control system 24 generally includes a control module 40 with a processor 42, a memory 44, and an interface 46. The control module 40 may be a portion of a central vehicle control, a stand-alone unit, or other system such as a cloud-based system. Other operational software for the processor 42 may also be stored in the memory 44. The processor 42 may be any type of microprocessor having desired performance characteristics. The memory 44 may include any type of computer readable medium that stores the data and control algorithms described herein such as a head unit synchronization algorithm 48.

The interface 46 facilitates communication with other systems such as the interactive display system 26 and the communication system 28. The interface 46 provides for communication and information exchange with other on-board vehicle systems and off-board vehicle systems via the communication system 28. On-board systems include, but are not limited to, vehicle sensors that provide, for example, vehicle tire pressure, fuel level and other vehicle diagnostic information. Off-board vehicle systems include, but are not limited to, a personal electronic device 50 of the user (e.g. a tablet, smart phone, wearable device, or other mobile device) or other remote network or remote computer. That is, the personal electronic device 50 in this disclosed non-limiting embodiment is a device typically carried or worn by the driver that defines a system 55 with the vehicle head unit 22 when in communication therewith, irrespective of whether the personal electronic device 50 is within or outside of the vehicle 20.

The interactive display system 26 can include a display 60 about which mechanical control elements 62 are arranged to provide a user interface mounted in a dashboard of a vehicle cabin for driver and front passenger access. Alternatively, the display 60 combines at least some of the control elements into a touch panel display.

The communication system 28 may include wired and wireless communication such as wireless radios using various types of wireless data communication protocols (e.g., Bluetooth™, ZigBee, ANT™, WiFi, WiMax, cellular network, and other wireless technology standards) and removable media such as USB devices to exchange data with, for example, the personal electronic device 50. The cellular network may include mobile devices, cell sites, base stations, repeaters, antennas, towers, and the like and may include GSM, GPRS, 3G, EVDO, mesh, or other cellular network types.

The interactive display system 26 displays, for example, multiple vehicle application icons 70. The vehicle application icons 70 represent user access to applications 72 that enable user control of vehicle systems 80 that pertains thereto including, but not limited to, the vehicle's entertainment media such as AM/FM radio, satellite radio, CDs, MP3s, video; navigation systems such as GPS navigation; climate controls; communication systems such as cellular phones, text, email; and vehicle accessory functions such as lights, door chimes, speed control and others through the display 60 and/or mechanical control elements 62. The applications 72 may reside in the memory 44 of the control module 40, and/or the personal electronic device 50, and/or, cloud and/or the particular vehicle system 80.

The personal electronic device 50 is operable to display and download the applications 72 that enable user control of the vehicle systems 80. The applications 72 may also be represented as application icons 52 on the personal electronic device 50 that permits a user to configure the interactive display system 26 of the vehicle head unit 22. That is, the application icons 52 which represent the applications 72 may be arranged on the personal electronic device 50 such that the vehicle application icons 70 are correspondingly synchronized and arranged on the display 60 of the vehicle head unit 22.

The display 60 of the vehicle head unit 22 typically utilizes relatively large vehicle application icons 70 compared to the application icons 52 displayed on the personal electronic device 50 to facilitate selection and operation of a vehicle system 80 while the vehicle 20 is being driven. Accordingly, as such, the user may readily configure the application icons 52 displayed on the personal electronic device 50 off-board the vehicle 20 such that the associated vehicle application icons 70 can be synchronized thereto when the driver approaches or enters the vehicle 20.

Figure 2:
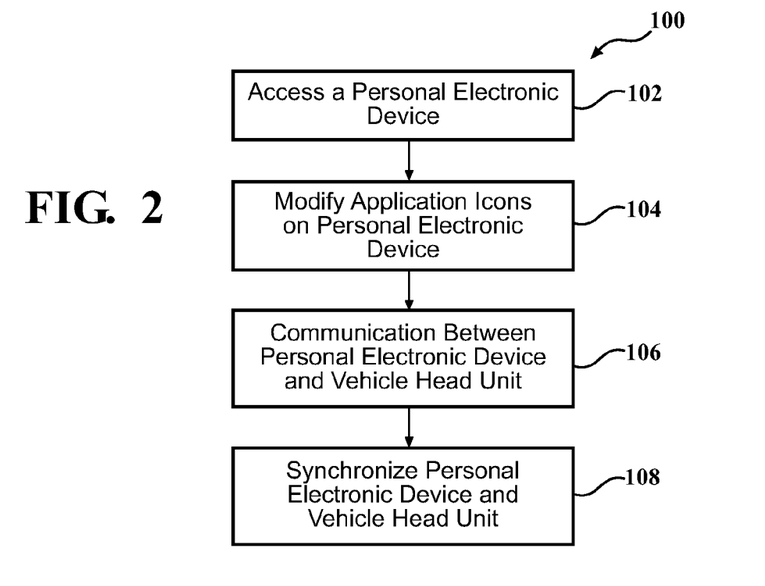
FIG. 2 is a flow chart illustrating operations of the vehicle system according to one disclosed non-limiting embodiment.

The functions of the algorithm 48 are disclosed in terms of functional block diagrams in FIG. 2 and representative pages in FIGS. 3-10, and it should be appreciated that these functions may be enacted in either dedicated hardware circuitry or programmed software routines capable of execution in a microprocessor based electronics control embodiment. That is, the memory 44 is an example computer storage media having computer-useable instructions such as the algorithm 48 that, when executed, performs a method 100 to synchronize the vehicle application icons 70 displayed on the display 60 of the vehicle head unit 22 with that of the personal electronic device 50.

Figure 3:
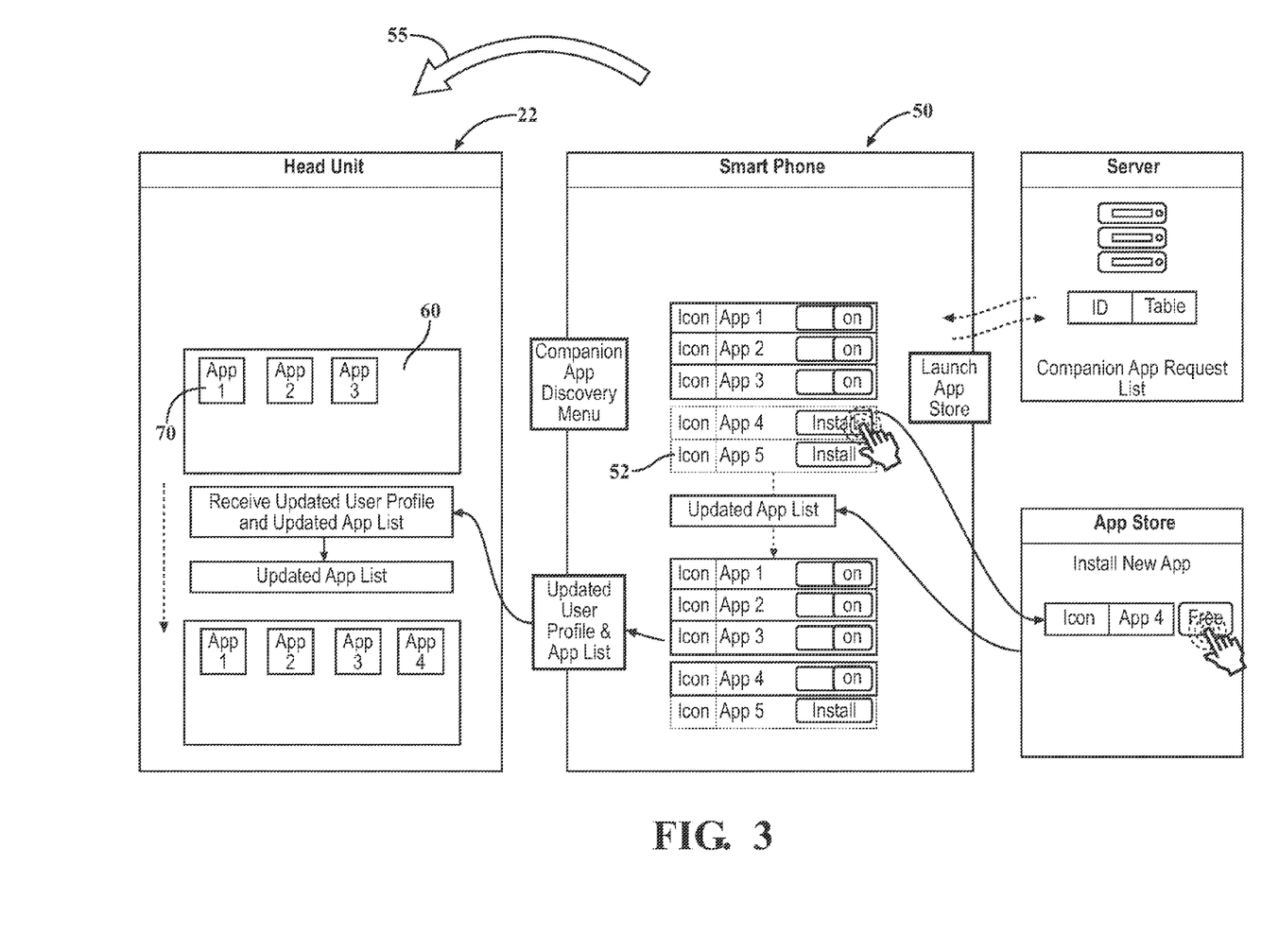
FIG. 3 are example screens of a vehicle head unit and a personal electronic device illustrating an interface therebetween according to one disclosed non-limiting embodiment for configuring application icons that are displayed on the head unit.

With reference to FIG. 2, initially, the method 100, according to one disclosed non-limiting embodiment, provides for user access to a mobile application on the personal electronic device that displays a list of all the applications 72 available to be utilized on the vehicle head unit 22 (step 102). It should be appreciated that various icons, interfaces, lists, and arrangements may be displayed on the personal electronic device 50 (FIG. 3). For example, the personal electronic device 50 may display the equivalent icon arrangement of that which is displayed on the display 60 of the vehicle head unit 22, to permit modifications thereof on the personal electronic device 50 (Step 104).

Applications 72 that have already been downloaded on the personal electronic device 50 are shown as available applications for the vehicle head unit 22. Those applications 72 that have not been downloaded (shown in phantom) can be displayed, for example, with the option to selectively install one or more of the available applications 72 on the vehicle head unit 22 (FIG. 3).

Next, at step 106, in response to the user approaching or entering the vehicle 20, the personal electronic device 50 is recognized and communicates with the vehicle head unit 22 via the communication system 28. That is, the vehicle head unit 22 will recognize the personal electronic device 50, and accordingly, at step 108, synchronize with the vehicle head unit 22. The synchronization may include, for example, installation, removal, and layout arrangement of the vehicle application icons 70 on the display 60 of the vehicle head unit 22 to be synchronized with the personal electronic device 50.

Once communication is established between the personal electronic device 50 and the vehicle head unit 22 via the communication system 28, the personal electronic device 50 and the vehicle head unit 22 are synchronized such that the desired applications 72 are available to the vehicle head unit 22 (step 108). That is, the display 60 of the vehicle head unit 22 is configured to display the multiple vehicle application icons 70 as configured on the personal electronic device 50.

In one disclosed non-limiting embodiment, the vehicle head unit 22 receives the applications 72 from the personal electronic device 50. That is, the applications 72 are transferred from the personal electronic device 50.

In another disclosed non-limiting embodiment, the vehicle head unit 22 receives the applications 72 from a source other than the personal electronic device 50, such as over a cellular, satellite or radio network.

Figure 4:
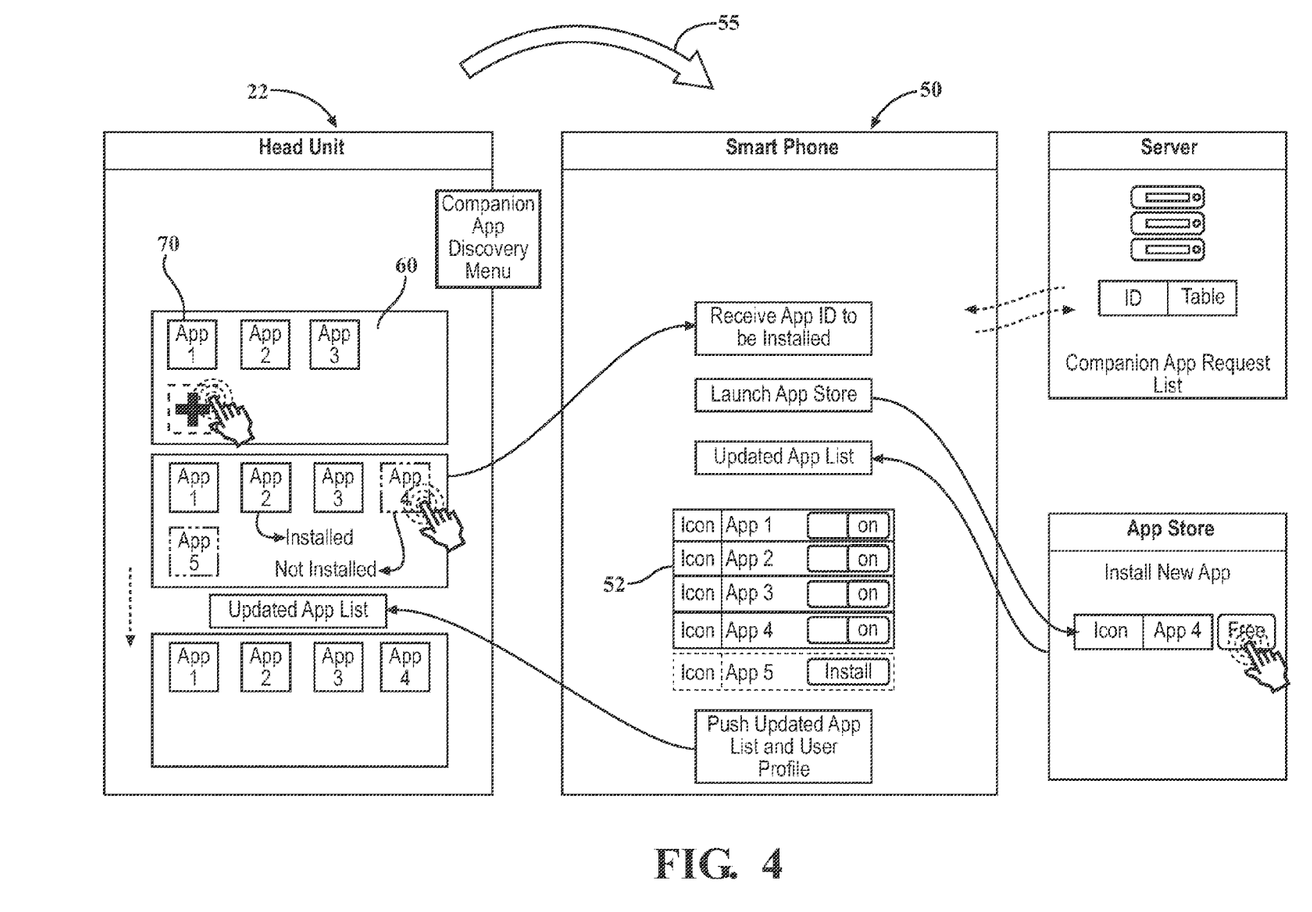
FIG. 4 are example screens on a vehicle head unit and a personal electronic device illustrating an interface therebetween according to one disclosed non-limiting embodiment for configuring application icons that are displayed on the head unit and the personal electronic device.
Figure 5:
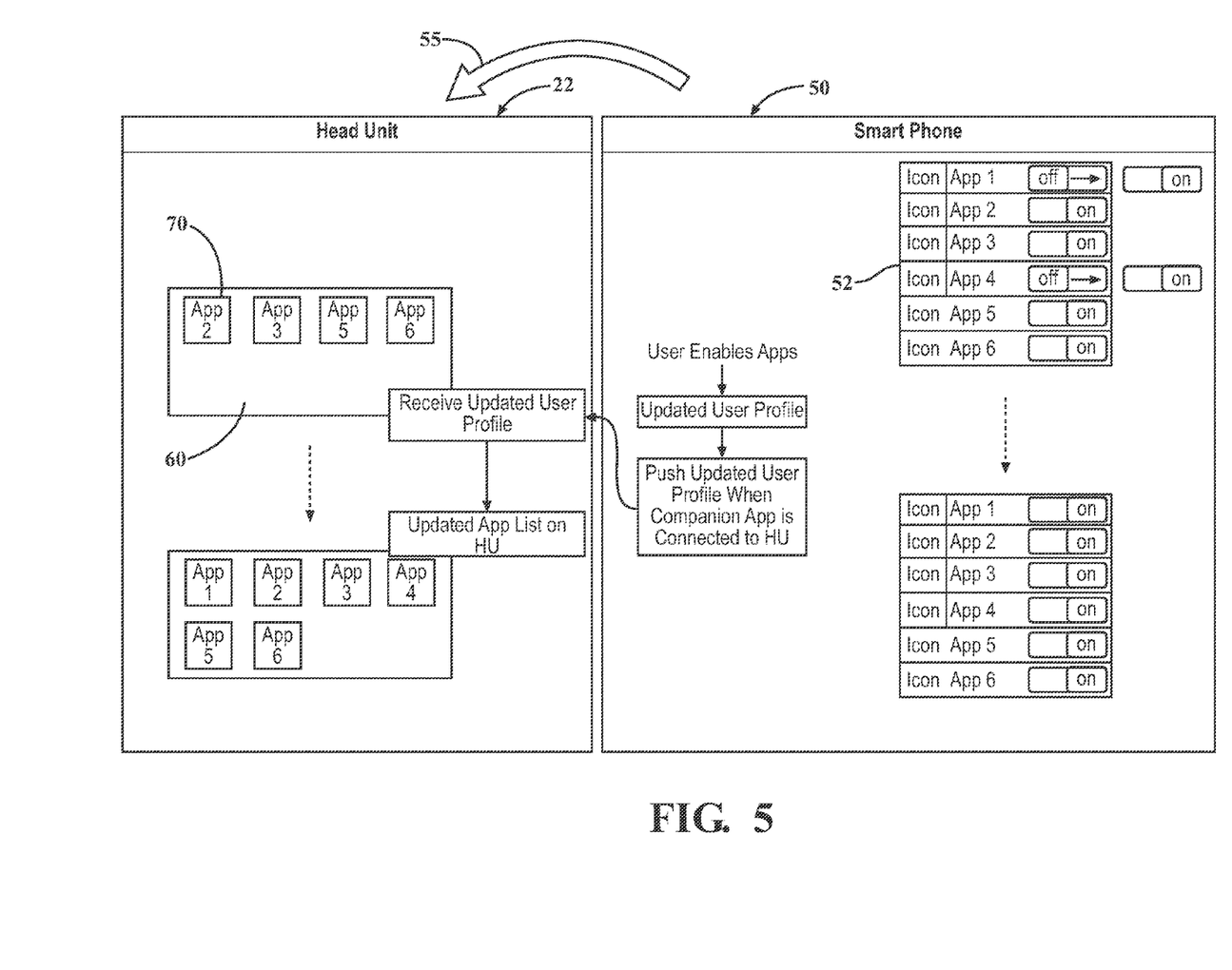
FIG. 5 are example screens on a vehicle head unit and a personal electronic device illustrating an interface therebetween according to one disclosed non-limiting embodiment for configuring application icons on the head unit.
Figure 6:
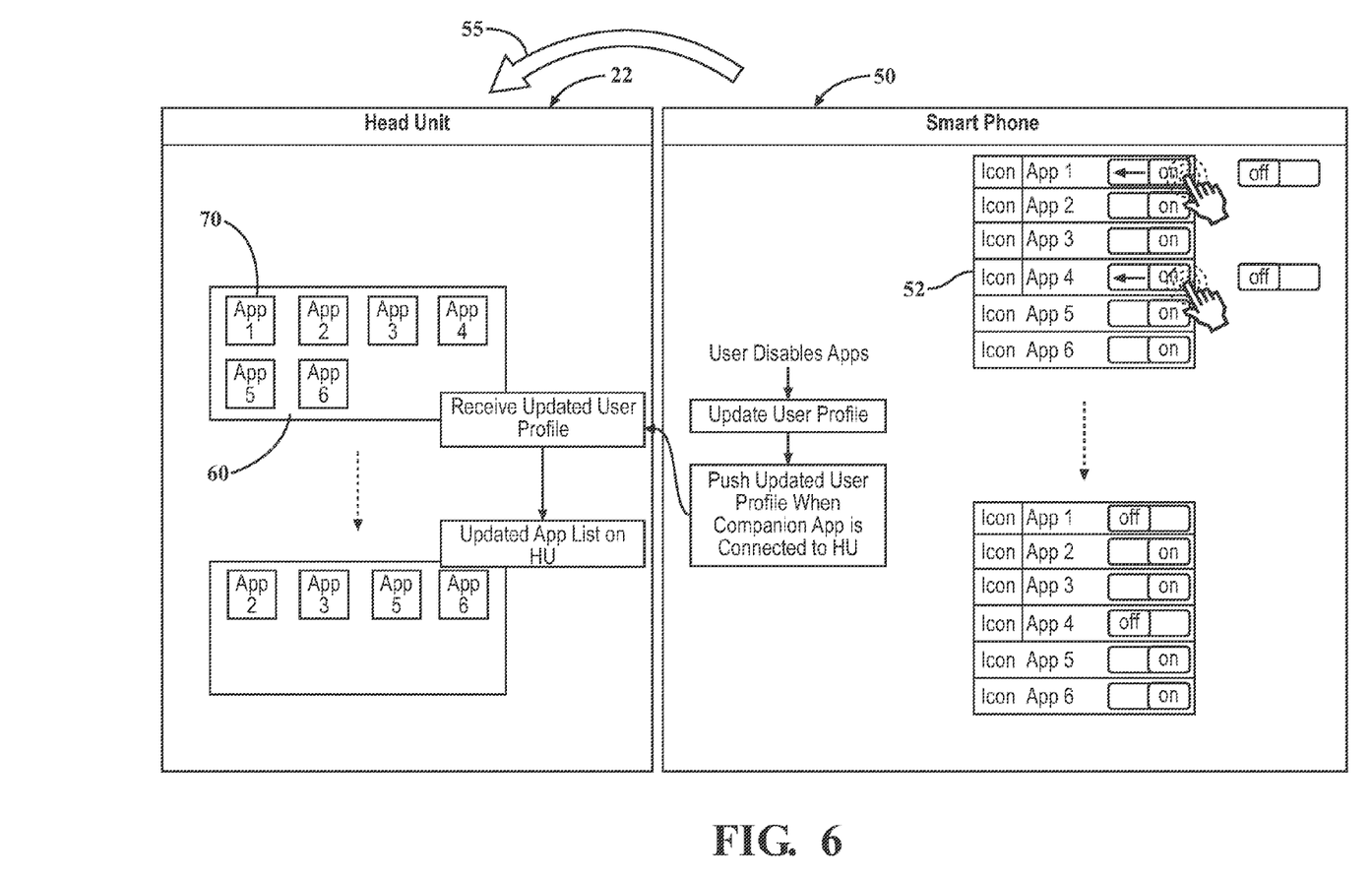
FIG. 6 are example screens on a vehicle head unit and a personal electronic device illustrating an interface therebetween according to one disclosed non-limiting embodiment for configuring application icons on the head unit.

In still another disclosed non-limiting embodiment, the vehicle head unit 22 need only activate resident applications 72 in response to synchronization with personal electronic device 50. That is, all the applications 72 are stored in the vehicle head unit 22 and are only selected via the personal electronic device 50. With reference to FIG. 4, in addition to synchronization with the personal electronic device 50, the vehicle head unit 22 may be directly accessed via the display 60 to install desired applications 72. That is, functionality to install or removal particular applications 72 is performed via the vehicle head unit 22 that then communicates with an applications source, e.g., an app store, via the personal electronic device 50.

Figure 7:
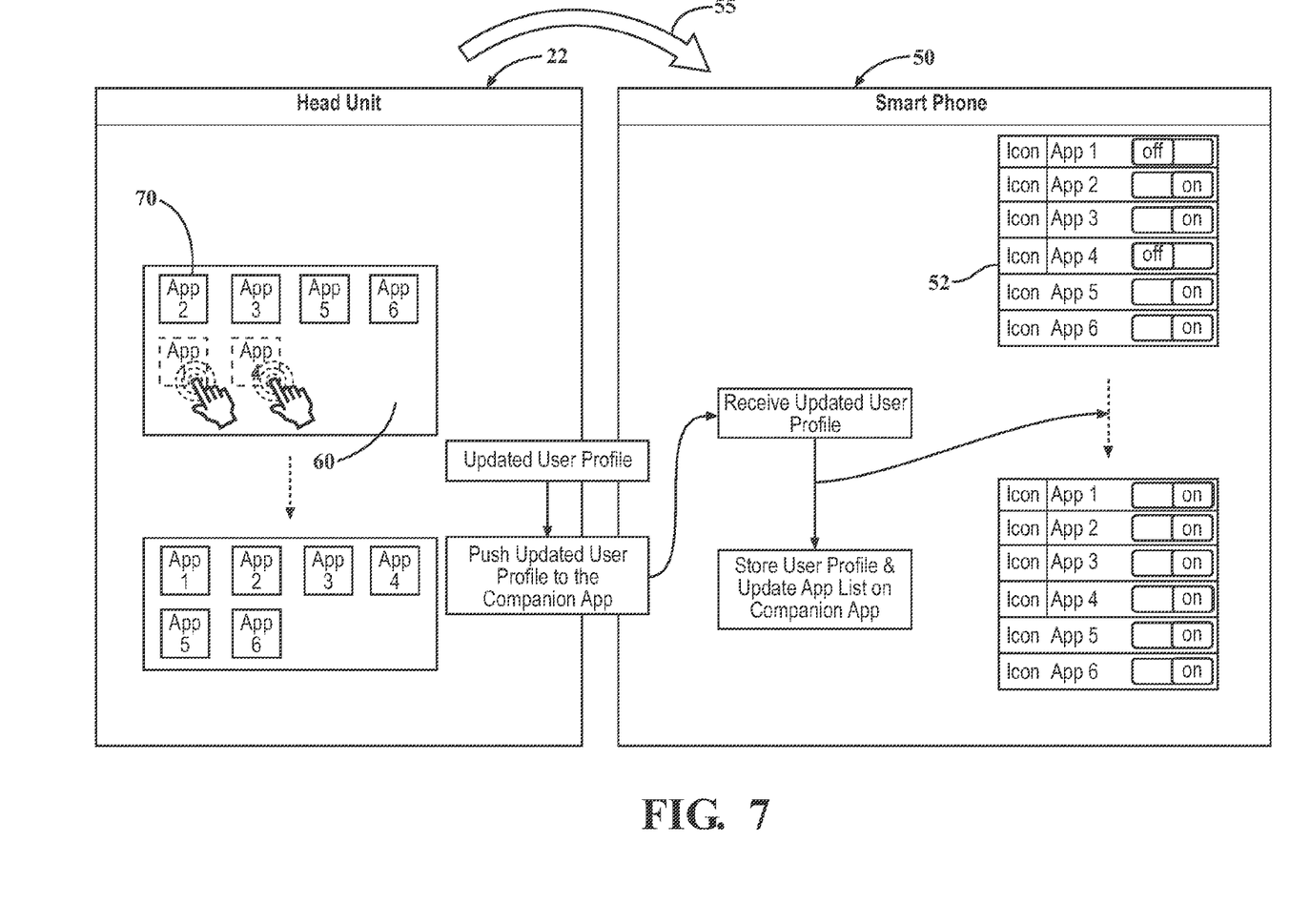
FIG. 7 are example screens on a vehicle head unit and a personal electronic device illustrating an interface therebetween according to one disclosed non-limiting embodiment for configuring application icons on the head unit and the personal electronic device.
Figure 8:
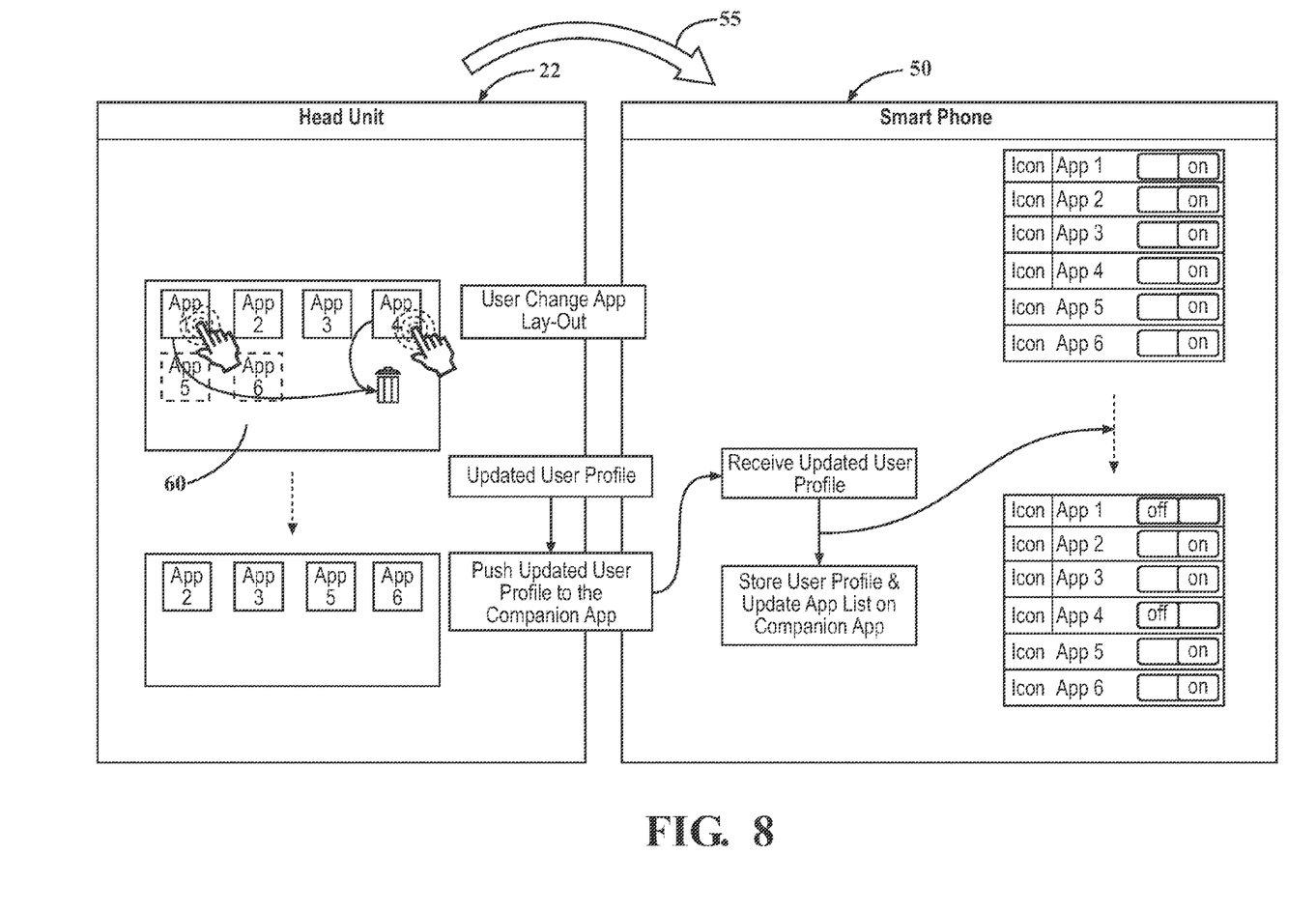
FIG. 8 are example screens on a vehicle head unit and a personal electronic device illustrating an interface therebetween according to one disclosed non-limiting embodiment for configuring application icons on the head unit and personal electronic device.
Figure 9:
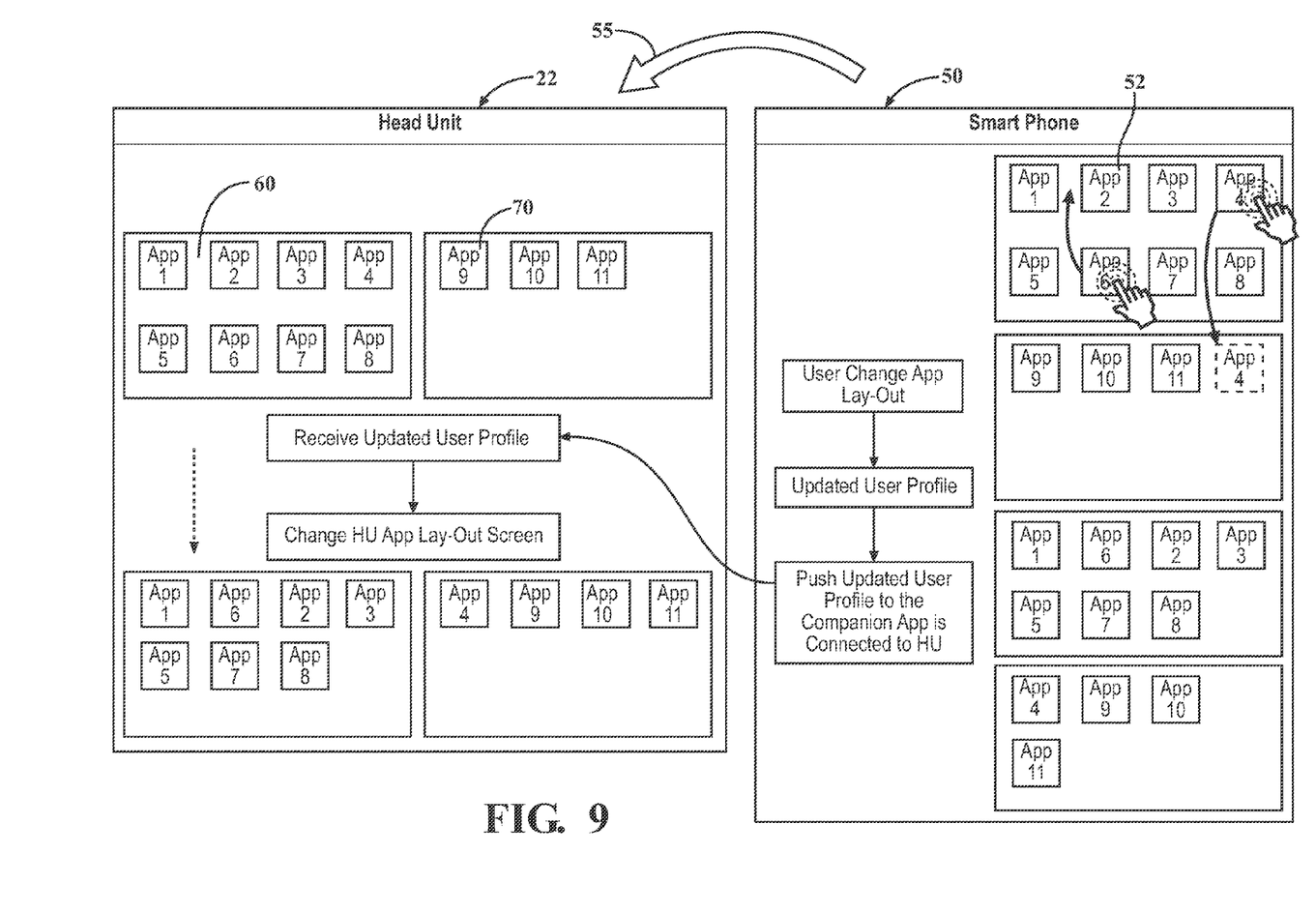
FIG. 9 are example screens on a vehicle head unit and a personal electronic device illustrating an interface therebetween according to one disclosed non-limiting embodiment for configuring application icons on the head unit and the personal electronic device.

In another disclosed non-limiting embodiment, the applications 72 need not be downloaded to the vehicle head unit 22, but may be accessible from the personal electronic device 50. That is, the applications 72 on the personal electronic device 50 are accessible by the vehicle head unit 22, but are resident on the personal electronic device 50. The user may select applications on the personal electronic device 50 which will then be utilized on the vehicle head unit 22. In other words, particular applications 72 may be enabled/disabled either via the personal electronic device 50 (FIGS. 5 and 6) and/or the vehicle head unit 22 (FIGS. 7 and 8).

Figure 10:
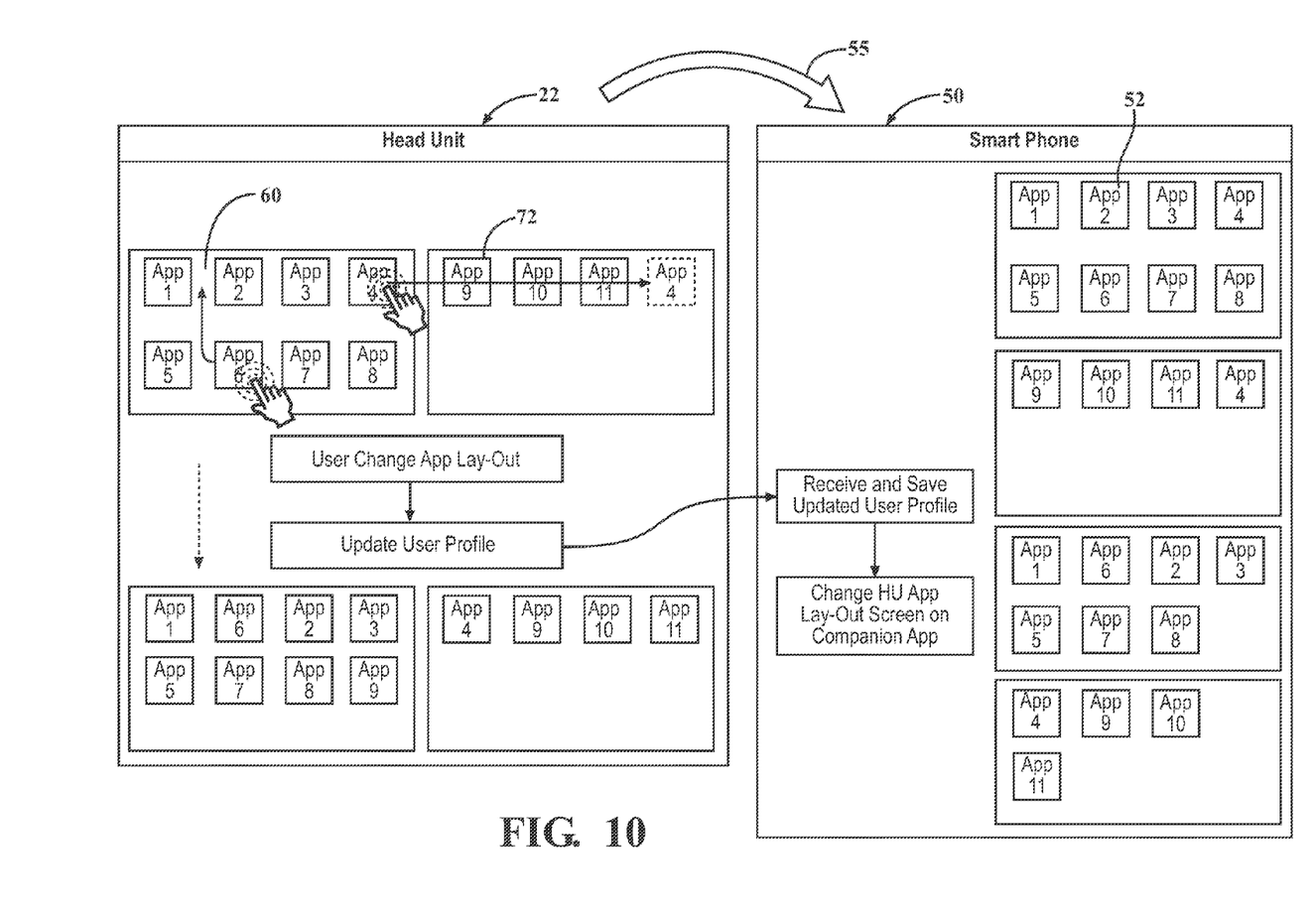
FIG. 10 are example screens on a vehicle head unit and a personal electronic device illustrating an interface to arrange applications from a vehicle head unit according to one disclosed non-limiting embodiment for configuring application icons on the head unit and the personal electronic device.

In another disclosed non-limiting embodiment, the layout of the application icons 52 may be effectuated on the personal electronic device 50 (FIG. 9) and/or the vehicle head unit 22 (FIG. 10). The arrangement of the application icons 52 displayed on the personal electronic device 50 are synchronized with the arrangement of the vehicle application icons 70 on the vehicle head unit 22 of the vehicle head unit 22 irrespective of which icons 52 and/or 70 are arranged. That is, the arrangement of icons 52, 70 is synchronized when the driver approaches or enters the vehicle 20 (Step 108 in FIG. 2).

Such synchronization permits the vehicle head unit 22 to be specifically configured to the particular driver. For example, one configuration may be provided by a wife and another configuration provided by a husband, in response to the recognition and communication between the vehicle head unit 22 and the husband's or wife's respective personal electronic device 50.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine their scope and content.

What is claimed:

1. A method comprising:
receiving a selection, from a list of a plurality of applications each operating a respective vehicle system, of which applications from the plurality of applications to selectively include on a vehicle head unit, the selection corresponding to a personal electronic device;
synchronizing, between the vehicle head unit and the personal electronic device, the applications selected from the list; and
displaying icons for at least some of the plurality of applications on the vehicle head unit based on the synchronization, including displaying the icons for the applications selected from the list.

2. The method as recited in claim 1, wherein each of the plurality of applications is associated with a respective icon displayed on the personal electronic device and selectively displayed on the vehicle head unit based on the synchronization.

3. The method as recited in claim 1, wherein at least one of the plurality of applications is enabled or disabled on the vehicle head unit, yet remains synchronized with the personal electronic device.

4. The method as recited in claim 1, further comprising:
receiving, from the personal electronic device, an arrangement of the icons to be displayed on the vehicle head unit; and
synchronizing, between the vehicle head unit and the personal electronic device, the arrangement, wherein:
displaying icons for at least some of the plurality of applications on the vehicle head unit based on the synchronization includes displaying icons for the applications selected from the list on the vehicle head unit according to the arrangement.

5. The method as recited in claim 1, wherein receiving the selection corresponding to the personal electronic device includes receiving a user profile including the selection of which applications from the plurality of applications to selectively include on the vehicle head unit, the user profile corresponding to the personal electronic device, the method further comprising:

updating a user profile including the selection, the update reflecting a change in the selection on any one of the personal electronic device and the vehicle head unit.

6. A method for synchronizing a personal electronic device and a vehicle head unit, the method comprising:
receiving a selection, from a list of a plurality of applications available for utilization on a vehicle head unit to operate a respective vehicle system, of which applications from the plurality of applications to include on a vehicle head unit, the selection corresponding to a personal electronic device;
selectively displaying an icon for a selected at least one application on an interactive display of the vehicle head unit; and
updating a user profile including the selection, the update reflecting a change in the selection on any one of the personal electronic device and the vehicle head unit, the user profile associated with the personal electronic device.

7. The method as recited in claim 6, wherein the selection is received from the personal electronic device.

8. The method as recited in claim 6, wherein the selection is received from the interactive display.

9. The method as recited in claim 6, wherein:
receiving the selection of which applications from the plurality of applications to include on the vehicle head unit includes enabling the at least one selected application, and
selectively displaying an icon for the selected at least one application includes displaying an icon for the enabled at least one selected application on the interactive display.

10. The method as recited in claim 6, wherein:
receiving the selection of which applications from the plurality of applications to include on the vehicle head unit includes disabling at least one of the plurality of applications, and
selectively displaying an icon for the selected at least one application includes displaying icons for only enabled applications on the interactive display.

11. The method as recited in claim 6, further comprising:
installing the selected at least one application on the vehicle head unit when the selected at least one application is not installed on the vehicle head unit, wherein:
selectively displaying an icon for the selected at least one application includes displaying an icon for the installed at least one selected application on the interactive display.

12. The method as recited in claim 6, further comprising:
arranging a layout of the icons displayed on the interactive display, wherein:
selectively displaying an icon for the selected at least one application includes selectively displaying icons in the arranged layout.

13. The method as recited in claim 12, wherein arranging the layout is performed on the personal electronic device.

14. The method as recited in claim 12, wherein arranging the layout is performed on the interactive display.

15. A method for synchronizing the display of icons between a personal electronic device and a head unit in a vehicle, comprising:
receiving, on a vehicle head unit, a modified icon display configuration from a personal electronic device, the modified icon display configuration reflecting a user's modification to an icon display configuration presented on the personal electronic device, the presented icon display configuration displaying icons associated with a plurality of applications available for utilization on the vehicle head unit, in a configuration subject to selective modification by the user; and
displaying, on the vehicle head unit, icons associated with at least some of the applications according to the modified icon display configuration.

16. The method as recited in claim 15, further comprising:
receiving, on the vehicle head unit, a list of which of the plurality of applications to include on the vehicle head unit, wherein:
displaying icons associated with at least some of the applications according to the modified icon display configuration includes displaying icons for the included plurality of applications according to the modified icon display configuration.

17. The method as recited in claim 16, wherein:
receiving the list of which of the plurality of applications to include on the vehicle head unit includes receiving a list of which of the plurality of applications to enable or disable on the vehicle head unit, and
displaying icons associated with at least some of the applications according to the modified icon display configuration includes displaying icons for only the enabled of the plurality of applications according to the modified icon display configuration.

18. The method as recited in claim 16, wherein receiving the list of which of the plurality of applications to include on the vehicle head unit includes receiving at least one application not installed on the vehicle head unit, further comprising:
installing, on the vehicle head unit, the at least one not installed application, wherein:
displaying icons associated with at least some of the applications according to the modified icon display configuration includes displaying, responsive to the installation, icons for at least some of the applications, including an icon for the installed application, according to the modified icon display configuration.

* * * * *